Patented Jan. 12, 1932

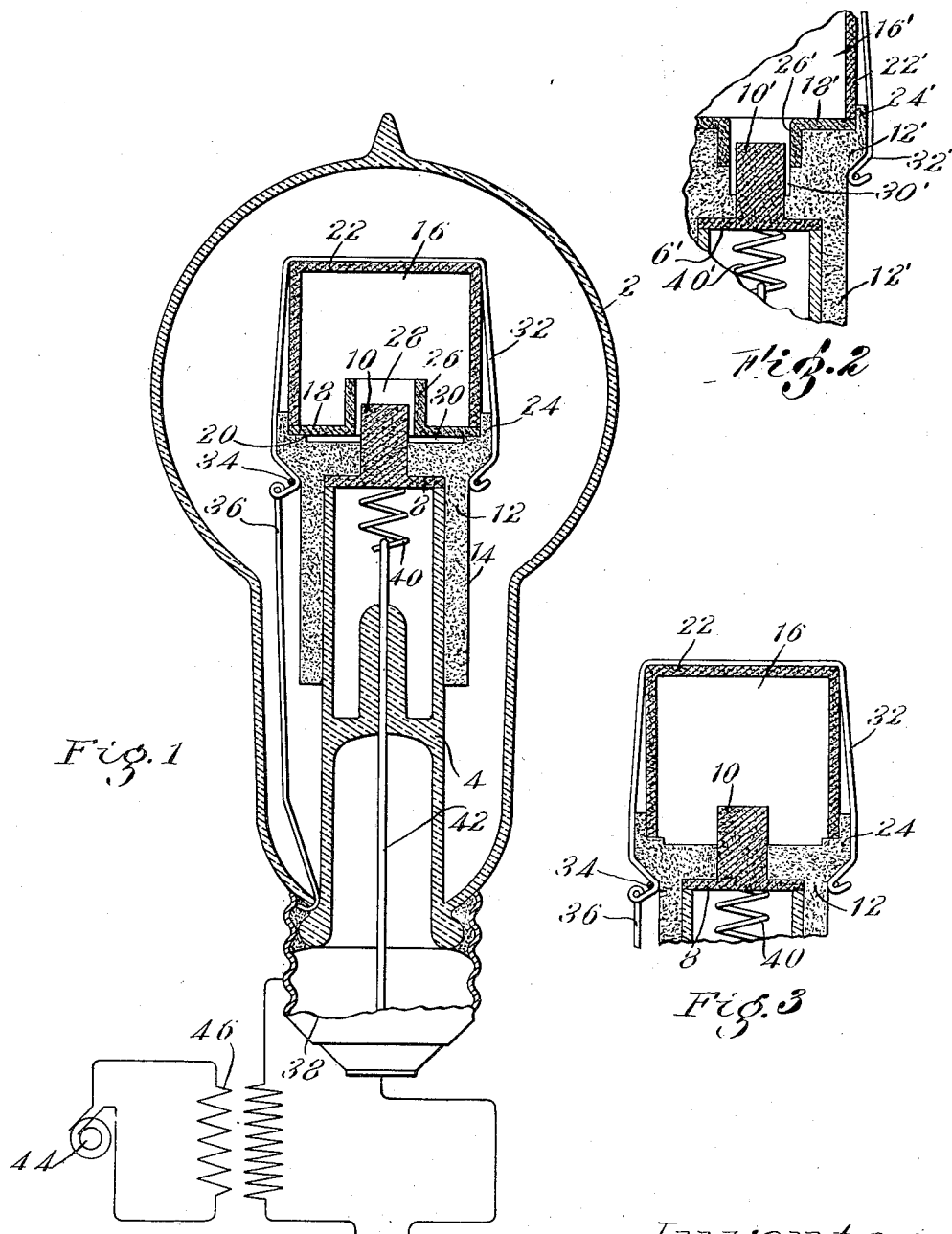

1,841,289

UNITED STATES PATENT OFFICE

JAMES L. JENKS, JR., OF MEDFORD HILLSIDE, MASSACHUSETTS, ASSIGNOR TO RAYTHEON INC., OF CAMBRIDGE, MASSACHUSETTS, A CORPORATION OF MASSACHUSETTS

GASEOUS CONDUCTION DEVICE

Application filed May 16, 1925. Serial No. 30,730.

The present invention relates to electrical apparatus and more particularly to gaseous conduction apparatus in which electrical conduction is caused to take place by gaseous ionization between the electrodes.

One of the principal disadvantages of the usual form of gaseous conduction tube lies in the fact that the continued operation of the tube causes disintegration of the conduction members, and the surfaces of the receptacle and the electrode support become blackened, thereby causing non-uniform electrical stresses throughout the tube and making its operation irregular and erratic. This effect has been found to be caused by the presence of a gaseous discharge adjacent the insulating material which usually forms a part of the receptacle.

A principal object of the present invention is to provide simple improvements in apparatus of this general nature whereby such disintegration and blackening may be prevented and the regular and uniform operation of the apparatus may be secured even after long continued use.

One feature of the invention includes the provision of a member of dielectric material which covers the parts of the receptacle or electrode supports in which undesirable discharges have heretofore been allowed to take place.

Another feature of the invention lies in the provision of means for covering or enclosing predetermined portions of the electrode surfaces with a dielectric member so that the discharge and electrical stresses will be confined to such surfaces. This latter feature is of especial importance in connection with carbon electrodes, in which the presence of even a small amount of impurity causes "sputtering" or disintegration of the electrode surface under electrical stresses. According to the present invention this effect, in so far as it exists, is entirely confined to the relatively small active surface area of the electrode.

The invention also comprehends fixedly spacing the electrodes in their relative positions each to each by means of the di-electric member and preferably in providing a thin gas film of permanent, uniform thickness therebetween.

The invention accordingly consists in the features of construction, combinations of elements, and arrangements of parts as will be exemplified in the structure to be hereinafter described and the scope of the application of which will be indicated in the following claims.

In the accompanying drawings:

Fig. 1 illustrates one form of the invention as embodied in a rectifier tube included in a simple rectifying circuit; and Figs. 2 and 3 illustrate two modifications.

The invention is herein illustrated and described as embodied in a gaseous conduction tube of the type disclosed in the copending patent of Smith, No. 1,617,179, granted February 8, 1927, which depends for its rectifying effect upon the great difference in mobility of the electron and the positive ion, which is taken advantage of by the special shapes and spacing of electrodes. The embodiment of the invention illustrated in Fig. 1 comprises a gas filled receptacle 2 of glass provided with a reentrant or internal stem 4. The upper end of the stem carries an anode, preferably of carbon, and provided with a flange base portion 8, and an upstanding central projection 10. A thimble 12 of di-electric material is received over the anode, the thimble being provided with a central opening to accommodate the projection 10, and a long downwardly extending portion 14 which fits snugly around the stem 4. Although any di-electric of sufficiently high insulating qualities is suitable for the thimble 12, it has been found preferable, for some reason which is not perfectly understood, to use lava, or other di-electric material which also possesses high refractory qualities or porous qualities or both. The thimble is enlarged at its upper end to support a cathode, also of carbon and preferably of hollow construction, as indicated generally at 16. The cathode consists of a base 18 resting upon an annular ledge 20 of the thimble, and a cover 22 which fits closely over the base. The cover portion 22 fits within an annular projecting sleeve 24 of the thimble. The central portion of the base 18 is formed with a central opening which is surrounded by a sleeve 26. The sleeve 26 thus encloses a central ionizing passage 28, into which the cylindrical projection 10 of the anode extends. The surfaces of the projection 10 and the sleeve 26 are essentially parallel and spaced apart a distance which is of the order of magnitude of the mean free path of corpuscles in the gas, so that no conduction can take place immediately between these surfaces. The formation of the ledge 20 leaves a small gap 30 immediately below the base of the cathode. This space should also be of approximately the magnitude of the mean free path of the corpuscles in the gas, thus forming a high resistance gap between the opposing surfaces of the cathode and the thimble. The cathode is retained in position by a wire 32 which extends over the cathode and is secured in position by a binding wire 34 encircling the thimble below the enlargement. The wire 32 also serves as the lead wire for the electrode, a connection being made from the wire through a conductor 36 to the shell of a plug 38 of usual form. The connection is made to the anode through a spring 40 to which is secured a lead wire 42 sealed into the glass stem and connected to the bottom portion of the plug. As explained in the copending Smith patent above referred to, the cooperation of the hollow cathode with the anode gives a rectifying effect through the accumulation of a space charge of positive ions in the cathode. The tube is illustrated as included in a simple rectifying circuit consisting of an alternating current generator 44, a transformer 46, and a suitable direct current load.

It will be seen that the lava thimble completely surrounds and encloses all except the desired surfaces of the electrode. These active surfaces are the upper end of the projection 10 and the interior of the hollow cathode 16. The peripheral surface of the projection 10 is separated from the inner surface of sleeve 26 by a uniform annular gas space, while the lower surface of base 18 is separated from the upper surface of thimble 12 by the uniform disc-shaped film of gas indicated at 30. These gas films separate the closely associated parts of the electrodes where sparking and like discharge phenomena are apt to occur and serve as insulation media in opposition thereto.

The lower extension of the thimble also covers and protects the glass stem against the possibility of any discharges occurring adjacent to it. It will be observed from the drawing that any paths for the electrical conduction through the thimble itself are relatively long so that electrical stresses in the thimble itself are not sufficient to be of any consequence. The recess 30 in the thimble which provides the short gaseous gap of high resistance, especially precludes any excessive stresses, either in this portion of the gaseous medium or in the central portion of the thimble itself, while actual contact of the thimble with the cathode occurs only at or near the peripheral margin. Thus the shortest possible electric lines of stress in the lava extend between the outer corners of the anode and the cathode. The restricted gaseous space 30 has been found also to prevent any longitudinal discharge between the projection 10 of the anode and the lower surface of the cathode.

In the construction thus provided, the discharge between the cathode and anode is controlled and directed and limited to predetermined portions of the surfaces thereof, while the other and remaining portions of electrode surface and of adjacent surfaces of the supporting elements are positively protected against spurious discharge, thereby precluding the possibility of exposing the surface of the cathode to the effects of "sputtering" or disintegration.

The modification shown in Fig. 2 is similar to the form shown in Fig. 1 and the parts being correspondingly designated. However, the flange 26' extends downwardly or outwardly and the thin gas space 30' extends along the anode instead of along the surface of the cathode, the axial length of the insulating thimble 12' consequently being longer. This construction has the following advantages over that shown in Fig. 1. By extending flange 26' into the thimble 12' the cathode may be centered more accurately and mounted more securely. By making the gas space 30' cylindrical it can easily be made accurately concentric with the anode 10' by drilling or reaming the thimble so that the thickness of the gas space 30' may readily be made uniform and accurate.

Certain features of the invention may be utilized without the mean-free-path principle as illustrated in Fig. 3 which is like Fig. 1 except in that the part 18—26 is omitted. While this arrangement does not function as efficiently it will rectify by virtue of the difference in shape and area of the opposed surfaces of the electrodes and it affords various advantages in isolating the interior of the cathode from the exterior thereof and in assemblage of parts.

This application is in part a continuation of application Serial No. 752,867, filed November 29, 1924, and the subject-matter here disclosed may be used in conjunction with that disclosed in either of the following patents and applications: 1,617,174; 1,617,178; 1,617,180; and 1,617,181, all granted February 8, 1927; and Serial No. 13,145, filed March 5, 1925; Serial No. 13,146, filed March 5, 1925; and Serial No. 22,988, filed April 14, 1925. For example the cathode may be coated on the inside with barium and strontium nitrate, which is converted into an oxide by heating, and the tube may be filled with helium at a pressure of 10 to 15 mm. of mercury.

As many possible embodiments may be made of the above invention and as many changes might be made in the embodiment above set forth, it is to be understood that all matter hereinbefore set forth or shown in the accompanying drawings, is to be interpreted as illustrative and not in a limiting sense.

I claim:

1. An electric discharge device having an electrode, a flange depending therefrom to form an opening, a second electrode extending into said opening and having a portion whose cross-section approximates that of the opening, a recessed sleeve of insulating material surrounding the second electrode, said flange projecting into the recess of said material.

2. In a gaseous discharge device, an electrode and an insulator, means for restricting the operating area of said electrode comprising an annular cylinder of material surrounding said electrode, with one end of said cylinder terminating at a point adjacent the operating end of said electrode, and spaced therefrom a distance but slightly greater than the distance through which an electron must fall to produce ionization at the impressed voltage, the length of the portion of said cylinder adjacent to said electrode being greater than said distance.

3. In a gaseous discharge device, an electrode and an insulator, means for preventing electrical breakdown between said electrode and said insulator comprising an annular cylinder of material surrounding said electrode and spaced therefrom a distance but slightly greater than the distance through which an electron must fall to produce ionization at the impressed voltage.

4. In an electrical discharge device, an electrode and an insulating member perforated to receive said electrode therethrough to form a space between said electrode and said material, the width of the said space being but slightly greater than the distance through which an electron must fall to produce ionization at the impressed voltage, and the depth of said space being several times the width thereof.

5. In an electric discharge device having electrodes, an electrode mounting comprising one of said electrodes, and an insulating support, said support having an annular extension which surrounds said electrode and is spaced therefrom a distance but slightly greater than the distance through which an electron must fall to produce ionization at the impressed voltage, the length of the annular extension of said support adjacent to said electrodes being greater than said distance and the angle of the path of the discharge between said electrodes being less than 90°.

6. In a gaseous discharge device, a sealed receptacle having therein a gas at low pressure, an electrode and an insulator within said receptacle, means for restricting the operating area of said electrode comprising a member of material surrounding said electrode, with one end of said member terminating at a point adjacent the operating end of said electrode, and spaced therefrom a distance greater than the distance through which an electron must fall to produce ionization at the impressed voltage and at the pressure of said gas but less than the distance at which substantial ionization takes place in said space, the length of the portion of said cylinder adjacent to said electrode being greater than said distance.

7. In a gaseous discharge device, a sealed receptacle having therein a gas at low pressure, an electrode and an insulator within said receptacle, means for preventing electrical break-down between said electrode and said insulator comprising a member surrounding said electrode and spaced therefrom a distance greater than the distance through which an electron must fall to produce ionization at the impressed voltage and at the pressure of said gas but less than the distance at which substantial ionization takes place in said space.

8. In an electrical discharge device, a sealed receptacle having therein a gas at low pressure, an electrode and an insulating member perforated to receive said electrode therethrough to form a space between said electrode and said member, the width of the said space being greater than the distance through which an electron must fall to produce ionization at the impressed voltage and at the pressure of said gas but less than the distance at which substantial ionization takes place in said space, and the depth of said space being several times the width thereof.

9. In an electric discharge device having electrodes, an electrode mounting comprising one of said electrodes, an insulating support, said support having an annular extension which surrounds said electrode and is spaced therefrom a distance greater than the distance through which an electron must fall to produce ionization at the impressed voltage but less than the distance at which substantial ionization takes place in said space, the length of the annular extension of said support adjacent to said electrodes being greater than said distance and the angle of the path of the discharge between said electrodes being less than 90°.

10. In an electrical discharge device, in combination, a gas-filled receptacle having an internal stem, an insulating thimble seated upon said stem and having a part extending downwardly about said stem, said thimble having an opening therein, an electrode extending through said opening in said thimble, and an electrode having a bottom wall, said bottom wall having an opening therein into which said first-mentioned electrode projects and said second-mentioned electrode having a flange-like portion extending about the opening in its bottom wall and into the opening in said thimble, the spacing between said flange-like portion and said first-mentioned electrode and the spacing between said first-mentioned electrode and the walls of the opening in said thimble being less than that at which substantial ionization takes place.

11. In an electrical discharge device, in combination, a gas-filled receptacle having an internal stem, an insulating thimble seated upon said stem and having a part extending downwardly about said stem, said thimble having an opening therein, an electrode extending through said opening in said thimble, said opening in said thimble being stepped to provide a portion spaced from said electrode by a distance less than that at which substantial ionization takes place and another portion having a greater spacing from said electrode, and an electrode having a portion extending into said second-mentioned stepped portion of said opening in said thimble but spaced from said first-mentioned electrode by a distance less than that at which substantial ionization takes place.

12. In an electrical discharge device, in combination, a gas-filled receptacle having an internal stem, an insulating member carried by said stem, and two conductive members interfitted with said insulating member, said three members being proportioned to provide a spacing between one conductive member and the remaining two members less than that necessary to maintain substantial gaseous conduction therebetween, the length of said spacing being a plurality of times said distance.

13. In an electrical discharge device, in combination, a gas-filled receptacle having an internal stem, an insulating thimble seated upon said stem and having a part extending downwardly about said stem, said thimble having an opening therein, an electrode extending through said opening in said thimble, and an electrode having a flanged portion extending into said opening and about said first-mentioned electrode, said first-mentioned electrode and said flanged portion of said second-mentioned electrode being spaced by a distance less than that at which substantial ionization takes places.

14. In an electrical discharge device, in combination, a gas-filled receptacle having an internal stem, an insulating thimble seated upon said stem and having a part extending downwardly about said stem, said thimble having an opening therein, an electrode extending through said opening in said thimble, and an electrode having a flanged portion extending into said opening and about said first-mentioned electrode, said flanged portion of said second-mentioned electrode and a portion of the wall of said opening in said thimble being spaced from said first-mentioned electrode by a distance less than that at which substantial ionization takes place.

15. In an electrical discharge device, in combination, a gas-filled receptacle having an insulating member supported therein, and two coacting electrodes interfitted with said insulating member, one of said electrodes being elongated, a portion of said elongated electrode being prevented from taking part in the gaseous conduction by reason of said portion being spaced from said insulating member and also from the coacting electrode by a distance insufficient to maintain substantial gaseous conduction.

Signed by me at Boston, Massachusetts, this 28th day of April, 1925.

JAMES L. JENKS, Jr.